United States Patent [19]

Green et al.

[11] Patent Number: 5,452,188
[45] Date of Patent: Sep. 19, 1995

[54] MODULAR STROBE BAR

[76] Inventors: Timothy M. Green; Paul A. Bennett; Paul L. Stein; William F. Gavenda; Andrew G. Smith, all of 10986 N. Warson Rd., St. Louis, Mo. 63114-2029

[21] Appl. No.: 868,385

[22] Filed: Apr. 14, 1992

[51] Int. Cl.⁶ .......................... B60Q 1/02; F21M 3/02
[52] U.S. Cl. .................... 362/227; 362/74; 362/231; 362/240; 362/261
[58] Field of Search ............. 362/74, 35, 61, 227, 362/231, 249, 247, 240, 431, 261

[56] References Cited

U.S. PATENT DOCUMENTS

| | | | |
|---|---|---|---|
| 2,549,330 | 4/1951 | Noel | 240/1.3 |
| 2,624,831 | 1/1953 | Farber | 240/1.3 |
| 3,462,591 | 8/1969 | Pichard | 240/1.3 |
| 3,488,630 | 1/1970 | Decker et al. | 340/77 |
| 3,639,751 | 2/1972 | Pichel | 362/261 |
| 3,895,345 | 7/1975 | Elvers et al. | 340/41 |
| 3,925,704 | 12/1975 | Camic | 315/200 |
| 4,300,186 | 11/1981 | Hurd | 362/431 |
| 4,375,634 | 3/1983 | Leis | 340/81 R |
| 4,423,471 | 12/1983 | Gordin et al. | 362/431 |
| 4,464,705 | 8/1984 | Horowitz | 362/12 |
| 4,480,211 | 10/1984 | Eggers | 315/70 |
| 4,488,209 | 12/1984 | Gosswiller | 362/431 |
| 4,495,550 | 1/1985 | Visciano | 362/398 |
| 4,580,201 | 4/1986 | Williams | 362/227 |
| 4,588,118 | 5/1986 | Ferenc et al. | 224/331 |
| 4,613,847 | 9/1986 | Scolari et al. | 362/157 |
| 4,620,268 | 10/1986 | Ferenc | 362/74 |
| 4,626,966 | 12/1986 | Bleiwas | 362/35 |
| 4,701,672 | 10/1987 | Sikora | 315/241 |
| 4,754,375 | 6/1988 | Ferenc | 362/74 |
| 4,788,633 | 11/1988 | Zimmerman et al. | 362/247 |
| 4,858,082 | 8/1989 | Hayward | 362/74 |
| 4,872,245 | 5/1989 | Lipman | 340/321 |
| 4,935,951 | 6/1990 | Robinson et al. | 379/37 |
| 4,942,503 | 7/1990 | Lyons | 362/74 |
| 4,956,753 | 9/1990 | Renfrew | 362/240 |
| 4,958,143 | 9/1990 | Knauff | 340/479 |
| 4,985,813 | 1/1991 | Putman | 362/184 |
| 5,027,260 | 6/1991 | Lyons et al. | 362/240 |
| 5,051,723 | 9/1991 | Long et al. | 340/566 |
| 5,097,397 | 3/1992 | Stanuch et al. | 367/240 |
| 5,161,871 | 11/1992 | Baliozian | 362/18 |

OTHER PUBLICATIONS

Strobovision Products Brochure, undated (Urca 1992).
"Principles of Strobe Lighting", Society of Manufacturing Whelen Engineering Company, Inc. Newsletter, vol. 5, undated (Urca 1992).
Excertps from Able 2 Products Company, Sho-Me ® brochure, 1989.
Whelan catalog pp. 14, 19, 43, 1990.

Primary Examiner—Ira S. Lazarus
Assistant Examiner—Y. Quach

[57] ABSTRACT

A light bar comprises a plurality of modules and a control circuit including a power supply for selectively energizing each of the modules. Each module includes a strobe lamp having an anode and a cathode for energizing the strobe lamp and having a trigger for firing the strobe lamp, a reflector positioned adjacent the strobe lamp to reflect light emitted by the strobe lamp and a circuit including a capacitor connected to the anode and the cathode for energizing the strobe lamp. The circuit of the module connects the capacitor and the trigger to the control circuit. An incandescent lamp or a high intensity discharge lamp may be used separately or in combination with the strobe. Multicolor operation or the use of LCD panels as filters or reflectors is also contemplated.

31 Claims, 6 Drawing Sheets

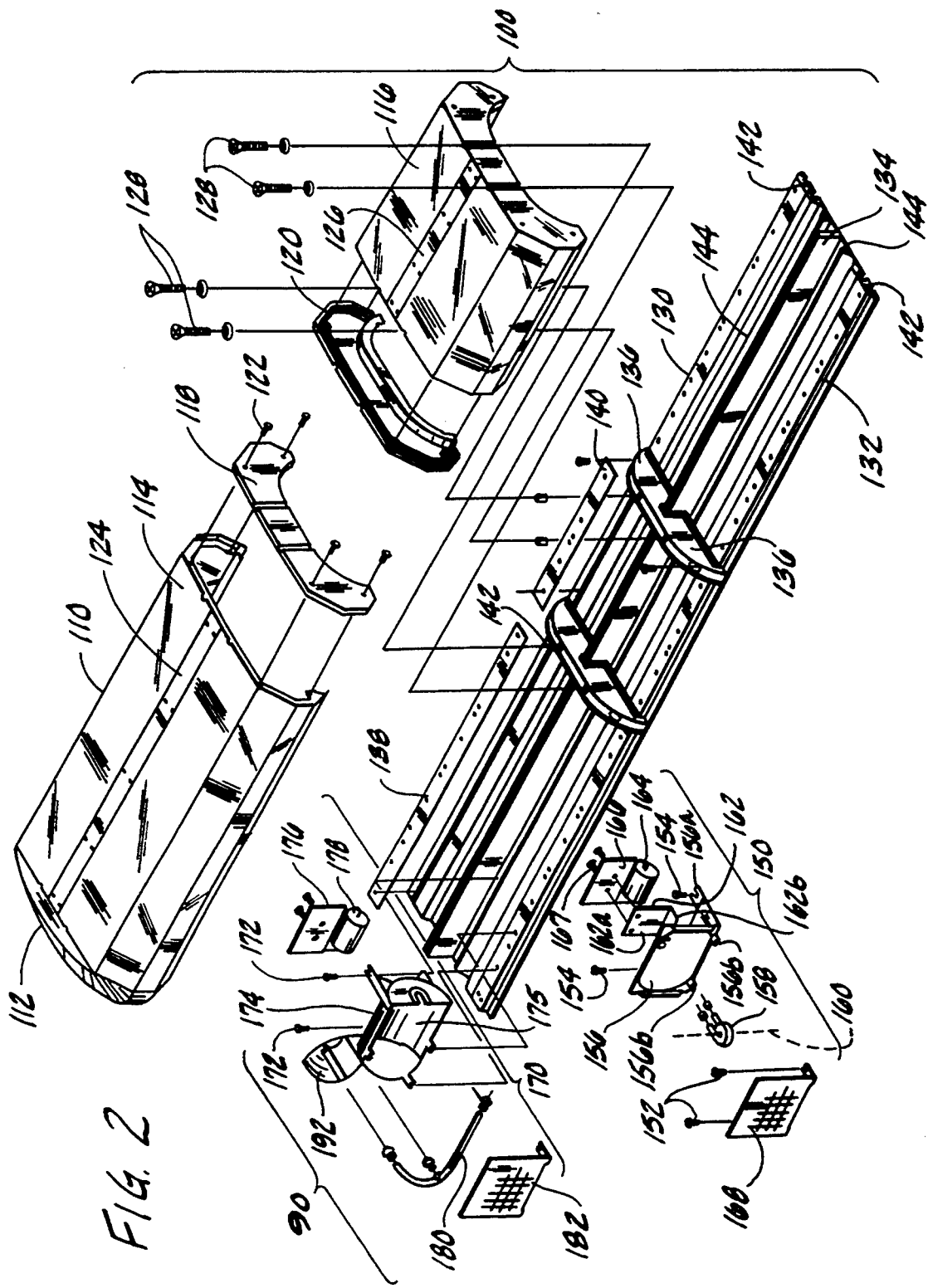

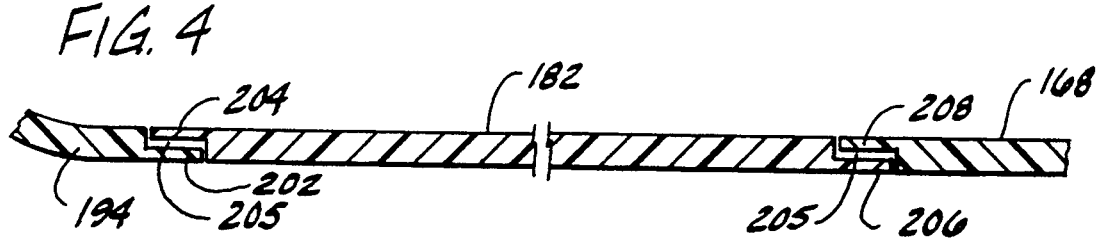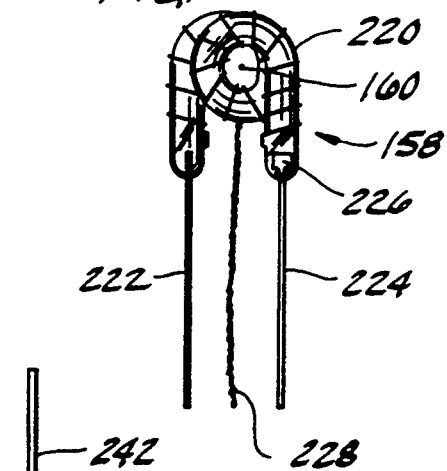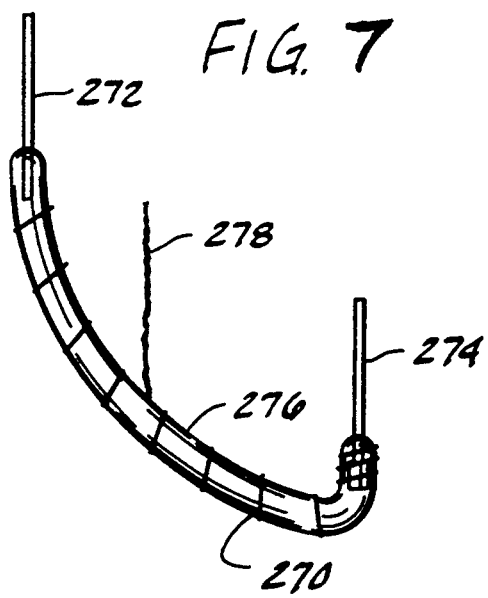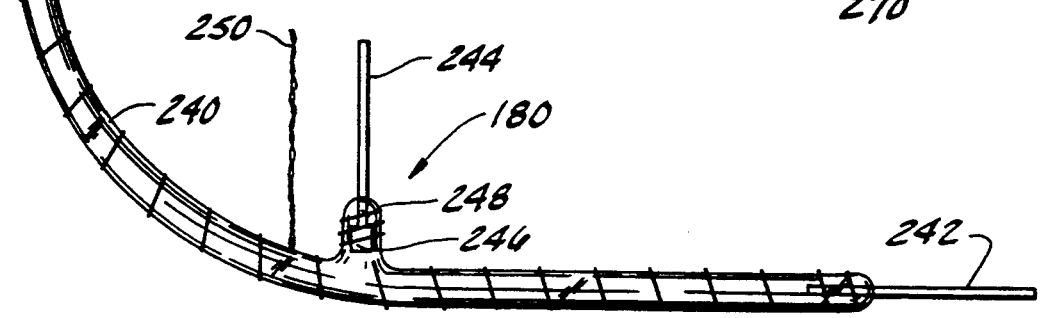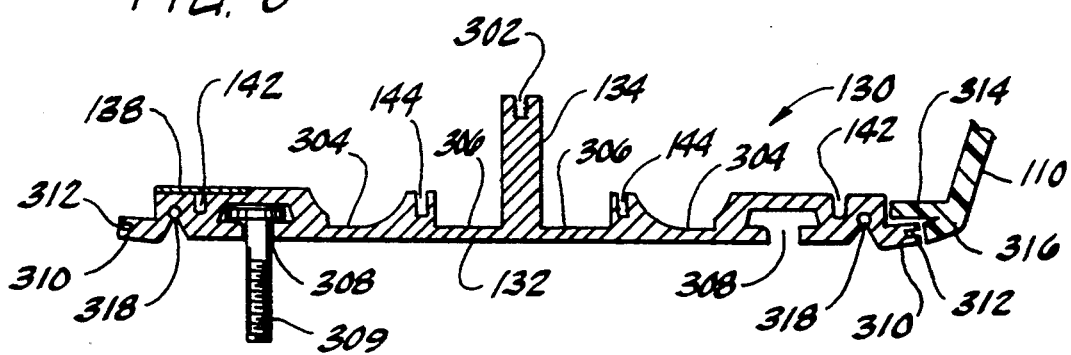

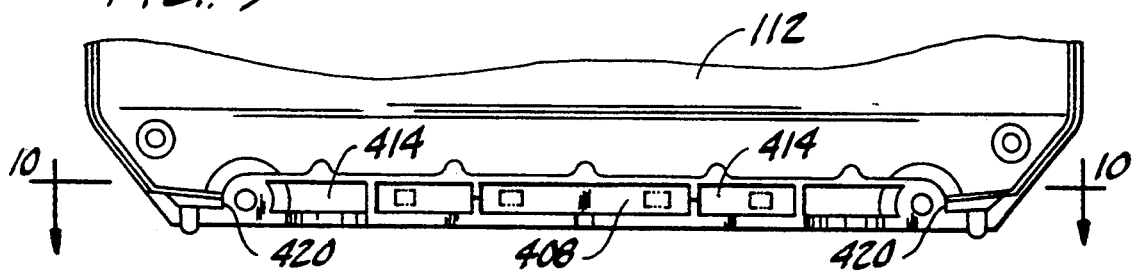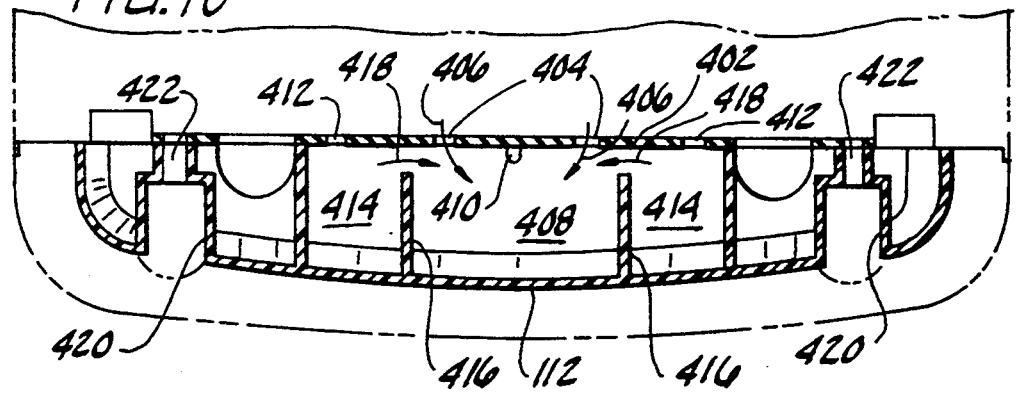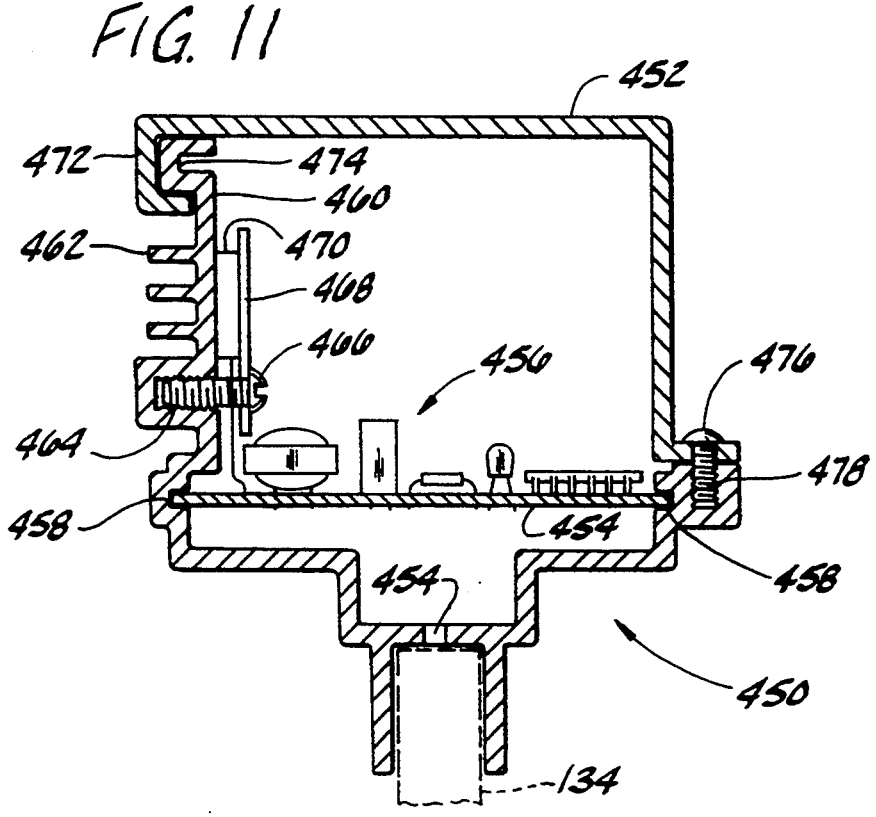

MODULAR STROBE BAR

BACKGROUND OF THE INVENTION

1. Field of the Invention

The present invention relates to warning light systems and particularly to light assemblies for installation on vehicles, especially emergency and other public service vehicles. In particular, the invention relates to a strobe light bar having a modular configuration which may include incandescent lighting. The modular configuration permits light bars of various sizes and configurations to be assembled.

2. Description of the Prior Art

Emergency lighting which is mounted on police or other public service vehicles has been known in the prior art. Generally, such lighting is mounted on the exterior of the vehicle in order to provide the most visibility. For example, warning lights are frequently mounted on the roof of an emergency vehicle so that the lighting is readily apparent from a distance and is generally above the roof line of most vehicles travelling on a roadway. Exterior mounting also minimizes the possibility that the light produced by the lighting system will adversely effect the vision of someone in the vehicle.

Light bars are generally the most desirable type of emergency exterior lighting because of their ability to provide a wide variety of types of illumination, because of the ease of installation, because such light bars avoid the need for vehicle modifications, and finally because of the ease of attaching and detaching such light bars. The light bar is generally a unit which spans the top of the vehicle and is supported by the vehicle by brackets which are attached to the vehicle. However, such prior art light bars suffer from many deficiencies.

There is a need for a modular light bar which employs primarily strobe lights or strobe lights used in combination with incandescent lights. There is a need for a modular light bar which provides for various configurations which can be easily assembled.

SUMMARY OF THE INVENTION

It is an object of this invention to provide a modular strobe bar having a plurality of low cost modules which can be easily assembled, serviced, or replaced.

It is another object of this invention to provide a modular strobe bar which includes incandescent lighting.

It is another object of this invention to provide a modular strobe bar having modules which include serviceable parts and parts which have higher failure rates than the other circuitry of the bar so that such parts can be easily and inexpensively replaced.

It is another object of this invention to provide a modular strobe bar having filters which are easily added to or replaced on each module.

It is a further object of this invention to provide a modular strobe bar or an individual strobe module which provides multicolor or color and white lighting.

It is another object of this invention to provide a modular strobe bar having a substantially rigid frame which provides for ease of attachment of multiple modules and which functions as a heat sink.

It is object of this invention to provide a modular light bar having integral curved modules in combination with linear modules so that 360° of lighting coverage may be provided.

It is another object off this invention to provide dedicated colored optical filters for each module of a strobe bar.

It is still another object of this invention to provide reflector modules for a strobe bar which include both strobe and incandescent lighting bulbs.

It is another object of this invention to provide a module for a strobe bar which includes all circuitry, particularly capacitors, as part of the module allowing a customer to replace the degraded components by either replacing a module or replacing the degraded portion of the module without having to service the power supply connected to the module.

It is yet another object of this invention to provide a modular strobe bar which allows for individual control of each of the luminaries or modules of the bar.

It is another object of this invention to provide a modular strobe bar having circuitry and capacitors at each modular reflector allowing smaller power supplies which are supported along the axial center of the strobe bar.

It is yet another object of this invention to provide an emergency warning light employing LCD panels and/or light pipes.

The invention comprises a light bar having a plurality of modules and a control circuit including a power supply for selectively energizing each of the modules. Each of the modules comprises a strobe lamp having an anode and a cathode for energizing the strobe lamp and having a trigger for firing the strobe lamp. The module also includes a reflector position adjacent the strobe lamp to reflect light emitted by the strobe lamp. The module also includes a circuit including a capacitor connected to the anode and cathode for energizing the strobe lamp, the circuit connecting the capacitor and the trigger to the control circuit including the power supply. Alternatively, the invention may include an elongate frame adapted to receive the plurality of modules, the frame having a substantially horizontal planar member and a substantially vertical member on the horizontal member to form a frame laving a cross-section in the shape of an inverted "T". Alternatively, the lamp may be a high intensity discharge lamp. Alternatively, the modules may be configured to emit light of various colors or white light with colored light. Alternatively, the strobe may have a central cathode. In addition, an LCD panel may be used for reflecting or light pipes for conducting the light in order to control its color or intensity.

Other objects and features will be in part apparent and in part pointed out hereinafter.

BRIEF DESCRIPTION OF THE DRAWINGS

FIG. 2 is an exploded view of the frame, lens and reflector modules of the modular strobe bar according to the invention.

FIG. 4 is a partial cross sectional view of the overlapping filters shown in FIG. 1.

FIG. 5A is a side elevation view of a helically wound strobe tube according to the invention.

FIG. 6 is a top elevation view of a "J" shaped strobe tube according to the invention.

FIG. 7 is a top elevation view of a curved strobe tube according to the invention.

FIG. 8 is an end elevation view of the inverted "T" frame according to the invention.

FIG. 9 is a partial end elevation view of an end cap of a lens according to the invention.

FIG. 10 is a cross sectional view taken along lines 10—10 of FIG. 9 illustrating an end cap of a lens according to the invention.

FIG. 11 is an end elevation view partially in cross section of a power supply support and printed circuit board with components which are part of the modular light bar according to the invention.

Corresponding reference characters indicate corresponding parts throughout the drawings.

DETAILED DESCRIPTION OF THE PREFERRED EMBODIMENTS

Figure 1:
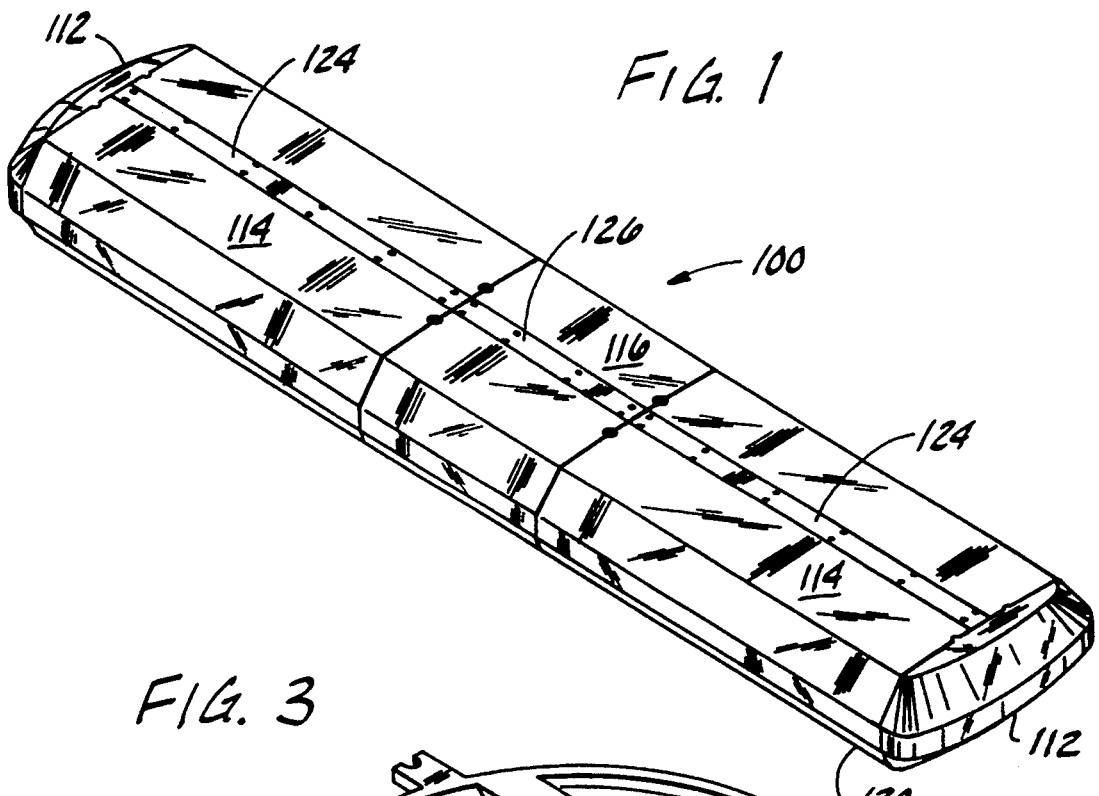
FIG. 1 is a perspective view of the modular strobe bar without a central speaker assembly according to the invention.

Referring to FIGS. 1 and 2, a modular strobe bar 100 according to the invention is illustrated. Bar 100 includes lens 110, frame 130, parabolic module 150, linear module 170, and curved module 190. Lens 110 includes a lens end cap 112 positioned at either end of the lens 110 between end caps 112. The lens includes outboard lens 114 and center lens 116 separated by lens bulkhead 118. A speaker assembly, not shown, may be located in place of the center lens 116. A gasket 120 may be provided between the lens bulkhead 118 and the center lens 116. Self-tapping screws 122 may be used to attach the bulkhead 118 to the outboard lens 114. Additionally, screws, not shown, may be used to attach the center lens 116 to the bulkhead 118 via the gasket 120. As illustrated in FIGS. 1 and 2, outboard lens 114 and center lens 116 have a transverse, horizontal, cross section which is in the shape of a "C". Each of these lenses may be made from two parts joined by an outboard lens rivet strip 124 or by a center lens rivet strip 126.

Frame 130 preferably comprises an elongate member of extruded aluminum adapted to receive the plurality of modules 150, 170, and 190. The frame includes a substantially horizontal planar base 132 and a substantially vertical planar member 134 projecting from and substantially perpendicular to the horizontal base 132 to form a frame 130 having a horizontal transverse cross section in the shape of an inverted "T". Frame 130 includes transverse bulkheads 136 and 138 which are engaged by bulkhead screws 128 to hold the lens 110 in position on the frame 130 thereby forming an enclosure between the lens 110 and frame 130 within which the modules 150, 170, and 190 are located. The base 132 may also be provided with an outboard locator strip 138 or a center locator strip 140 for assisting in positioning the modules on the frame 130. Specifically, strips 138 and 140 are preferably a narrow piece of metal of uniform width having openings therein through which the fasteners for holding the modules to the frame 130 are positioned. As indicated below in greater detail, frame 130 includes an outer channel 140 for receiving the outer fasteners of the modules such as fasteners 152 of module 50. Frame 130 also includes inner channel 142 for receiving the inner fasteners of the module such as inner fasteners 154 of module 150 and inner fasteners 172 of linear module 170. Strips 138 and 140 are positioned on the outer channel 142 so that the fasteners passing through the strips are held in the holes in the strips so that movement of the fasteners along the channel 142, such as caused by vibration or expansion and contraction, is prevented.

Parabolic module 150 includes a parabolic reflector 156 for reflecting light emitted by helical strobe tube 158. As illustrated in FIG. 2, tube 158 is helically wound about a substantially vertical axis 160. Module 150 also includes a capacitor clip 162 having a substantially vertical portion 162a perpendicularly joined to a substantially horizontal portion 162b. A capacitor 164 for energizing helical strobe tube 158 is connected to tube 158 and supported on the underside of horizontal portion 162b. Module 150 also includes a printed circuit board 166. A plurality of screws 167 hold the circuit board 166 and capacitor clip 162 to the rear portion of parabolic reflector 156.

Parabolic reflector 156 includes horizontal legs 156a having notches for receiving the fasteners 154. In addition, reflector 156 includes forward projecting, notched legs 156b for receiving fasteners 152. A filter 168 may be positioned in front of reflector 156 to filter light emitted by helical strobe tube 158 and light reflected by reflector 156.

Contiguously supported linear module 170 and curved module 190 together comprise a corner module of the modular strobe bar 100 forming a "J" combination. Linear module 170 includes a linear parabolic trough reflector 174 having parabolic surface 175 defining a focal axis which is linear. Surface 175 has a vertical transverse cross section in a parabolic shape. The rear of reflector 174 supports a capacitor clip 176 which in turn supports capacitor 178 for energizing of the curved J-shaped strobe tube 180. The linear portion of J tube 180 is coaxial with the linear focal axis of surface 175. Tube 180 spans both linear module 170 and curved module 190 to provide a single lamp for the corner module formed by combined linear module 170 and curved module 190. Alternatively, separate lamps may be used for each module 170 and 190. Module 170 may be provided with a flat filter, similar to filter 168, for filtering light emitted by strobe tube 180 or reflected by trough reflector 174.

Curved module 190 includes a curved parabolic trough reflector 192 having the same vertical transverse cross section as reflector 174 and having a focal line which is a curved axis terminating at an end point which is approximately tangent to and intersecting the linear focal axis of reflector 174. The curved portion of J-shaped strobe tube 180 is coaxial with the curved axis. A curved filter 194 may be positioned in front of curved trough 192 to filter light emitted by tube 180 or reflected by trough 192.

Figure 3:
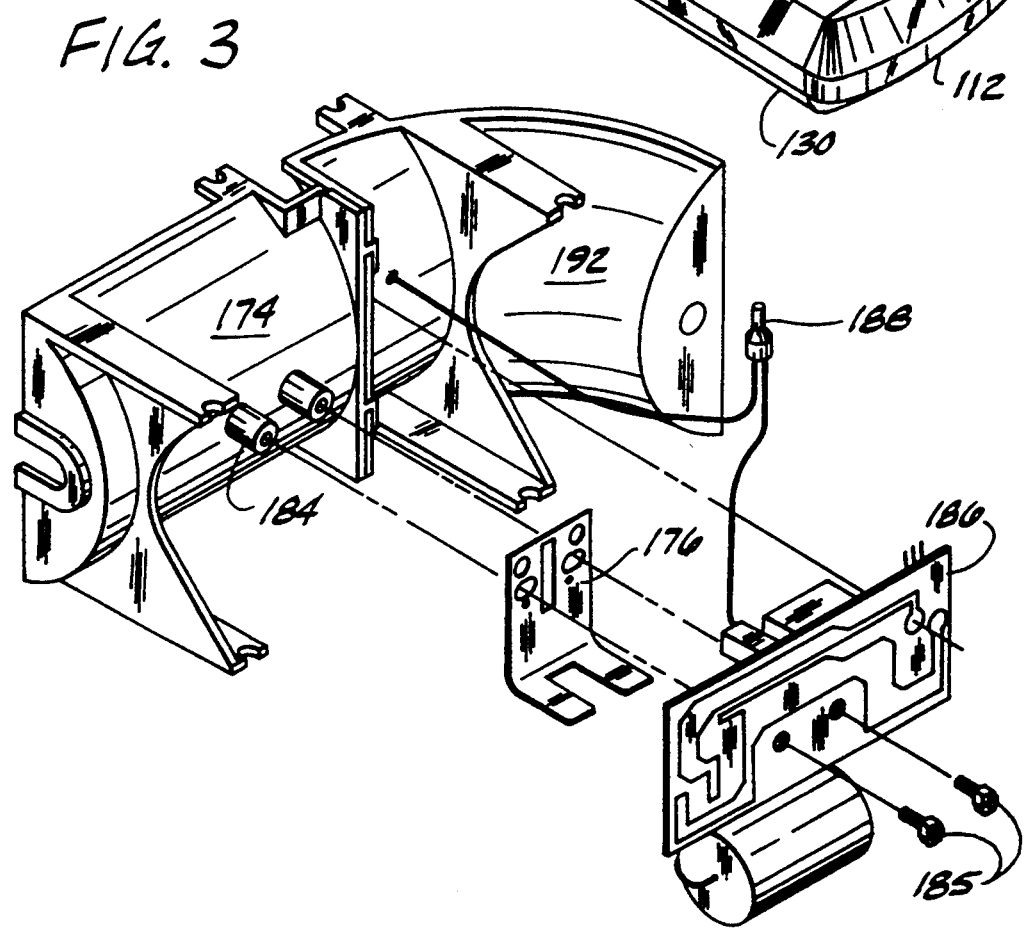
FIG. 3 is an exploded rear view showing a corner reflector assembly including a linear module and a curved module.

FIG. 3 illustrates the corner module in greater detail. In particular, trough reflector 174 includes rearwardly projecting standoffs 182 which are engaged by screws 184 to support a printed circuit board 186 and capacitor clip 176 on the rear of trough reflector 174. Connector 188 interconnects the cathode of J-shaped strobe tube 180 with a wire connected to printed circuit board 186.

Other wiring not shown connects the anode of tube 180 and the trigger terminal of tube 180 to the components of printed circuit board 186. Although the corner module is shown as a combination of a linear module 174 and a curved module 192, it is contemplated that any two modules may be positioned adjacent each other. For example, two contiguous linear modules 174 would form a linear combination and two curved modules 190 would form a 180° combination.

Referring to FIG. 4, a horizontal cross section of lenses 168, 182, and 194 is shown. Each of the lenses is provided with a horizontally extending portion for overlapping with the horizontally extending portion of an adjacent filter. In particular, curved filter 194 has a horizontally extending flange 202 which overlaps with a horizontally extending flange 204 of filter 182. Flanges 202 and 204 are offset so that flange 202 is an outer flange defining a flat surface with outer surface of filter 194 and flange 204 is an inner flange defining a flat surface with the inner surface of filter 182. A gap 205 between flanges 202 and 204 reduces the need for close tolerances in the thickness of the flanges. In addition, filter 182 has a correspondingly extending outer flange 206 which overlaps with an inner flange 208 of filter 168. The overlap prevents bleeding of light between filters and facilitates the location of filters contiguous to each other.

Referring to FIG. 5A, a plan elevation view of a helically wound strobe tube 158 is illustrated. The tube 158 includes a glass envelope 220 within which an ionizing gas is enclosed. Anode 222 is positioned within one end of the tube and cathode 224 including cathode plate 226 is positioned in the other end of the tube. A trigger terminal 228 is wound around the tube for firing the tube. Tube 158 is helically wound about axis 160.

Figure 5B:
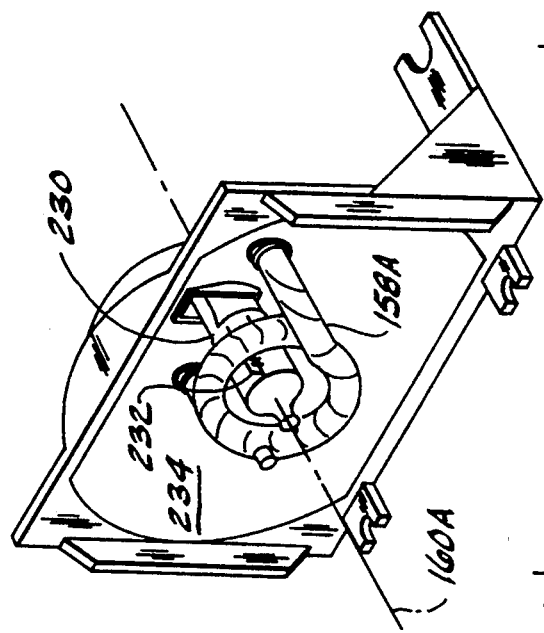
FIG. 5B is perspective view of a helically wound strobe wound around an axis coaxial with an axis of a tubular incandescent light according to the invention.

It is also contemplated that a strobe 158A may be wound about an axis 160A coaxial with an incandescent bulb 230 as shown in FIG. 5B. As illustrated in FIG. 5B, both lamps are supported by and in front of a parabolic reflector 234 which may be mounted on a vehicle. In particular, both lamps would intersect a focal point of the reflector 234. Preferably, the focal point would be on axis 160A. Incandescent bulb 230 comprises an elongate tube having a filament 232 preferably coaxial with axis 160A. It is also contemplated that bulb 230 need not be coaxial with axis 160A and could have an axis which intersects linear axis 160. Strobe lamp 158A generally emits white light or a bluish white light.

It is contemplated that strobe lamp 158A may be provided with means for blocking visible light within a first predetermined range emitted by the strobe lamp 158A. As a result, the light which is reflected by the reflector 234 and which is emitted by the strobe lamp 158A would be visible light of a predetermined color. For example, strobe lamp 158A may have a coating on the glass envelope thereof for absorbing all colors of light except for the predetermined visible color such as red or blue. Alternatively, the strobe lamp 158A may include a glass envelope having a dye which is on the envelope or embedded within the envelope for absorbing all colors of light except for the predetermined visible color. In another embodiment, a sleeve may surround the glass envelope of strobe lamp 158A, the sleeve being configured to absorb all colors of light except for one predetermined visible color.

Figure 12:
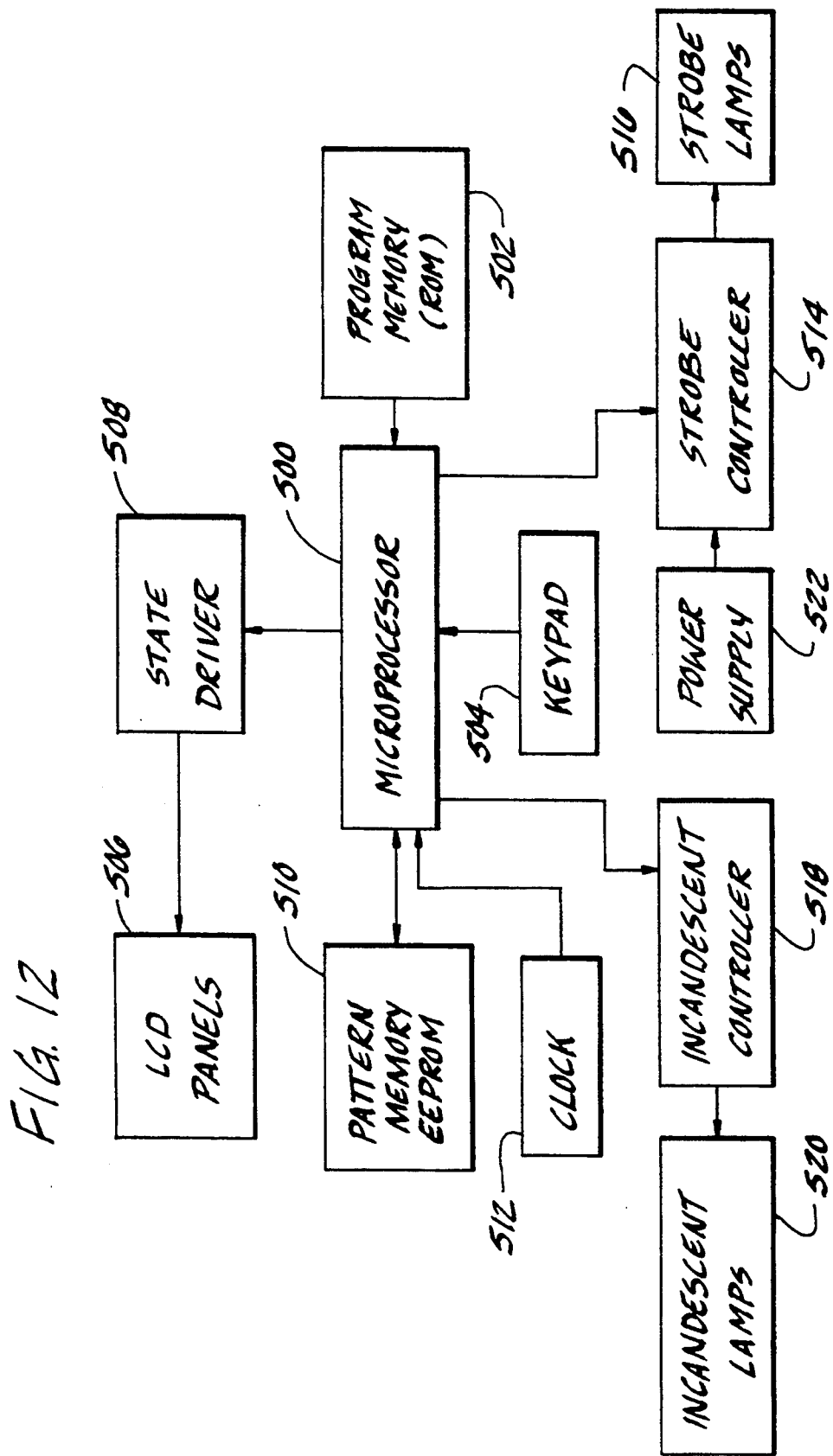
FIG. 12 is a block diagram of a circuit for controlling an LCD panel and associated strobe and incandescent lamps according to the invention.

Multicolor operation of the light bar 100 according to the invention is also contemplated. For example, the light bar may be configured so that the lamp of least one module emits visible light of a predetermined color different from the visible light emitted by the lamp of another of the modules. In one embodiment, one module may have a strobe tube emitting one color of light, such as blue, and another module may have another strobe tube emitting another color of light, such as red. In another embodiment, one of the strobe tubes may be configured for emitted color light whereas the other strobe tubes are all emitting white or blue-white light. It is also contemplated that one or more of the lamps of the modular strobe bar 100 may be a high intensity discharge lamp such as a continuous burning sodium arc lamp. In one aspect of the invention, wherein both strobe and incandescent lamps are employed in a single parabolic module, it is contemplated that each of the lamps is energized each cycle of a flash pattern by a microprocessor system as illustrated in FIG. 12.

FIG. 6 illustrates a J-shaped strobe tube 180 including a glass envelope 240 terminating in one end having anode 242 therein and a second end having another anode 242 therein. Centrally located between the ends of the elongate glass envelope 240 is a central cathode terminal 244 including a cathode plate 246 located within projection 248 of the envelope 240. A trigger terminal 250 is wound around the outer portion of the envelope 240. As noted above, J-shaped tube 180 is used in a corner reflector which employs both a linear module 170 and a curved module 190. Alternatively, if only a curved module 190 is being used as part of the strobe bar 100, a curved tube such as illustrated in FIG. 7 may be used. Curved tube 270 includes anode 272 and cathode 274 at either end of glass tube 276. As with the other strobe tubes, a trigger terminal 278 is wound around the glass envelope 276.

Although FIG. 6 is illustrated with a centrally located cathode and anodes located at either end of the J-shaped tube, it is contemplated that the strobe tube, according to the invention, may have any shape in which one terminal is located between the two end terminals. For example, a central anode with two cathodes, one at either end of the tube may also be employed. The purpose of the centrally located terminal is to reduce the distance between the anode and cathode thereby reducing the amount of voltage needed to charge and ionize the gas within the tube.

FIG. 8 illustrates a transverse horizontal cross section of the extruded frame 130 of the invention. Wall 134 projects upwardly from the planar base 132 to provide rigidity to the base 132. The top edge surface of wall 134 includes a grooved channel 302 having grooves in either or both sides thereof for engaging the threads of a screw. Base member 132 is also provided with recesses 304 for receiving the capacitors 164 and 178 of the modules. Recesses 304 have a curved surface which has the same curvature as the outer surface of the capacitors in order to facilitate heat transfer from the capacitors to the base member 132. Accordingly, base member 132 functions as a heat sink to absorb and dissipate heat generated by the capacitors of the modules. The frame 130 is also provided with water collecting channels 306 along its entire length for directing water from the unit to the end caps 112. As will be described below, the end caps 112 include structure for permitting the water to escape from the water collecting channels 306 without permitting water to invade the enclosure formed by the lens 110 and frame 130. The underside of base member 132 is provided with retaining slots 308 which run the entire length of the frame 130. Slots 308 receive bolt leads of one or more bolts 309 therein which engage supports or brackets for attaching the modular light bar 100 to a vehicle. As noted above, the frame 130 also includes outer grooved channels 142 and inner grooved channels 144. These channels have grooves on either or both sides thereof for engaging the threads of fasteners which hold the modules in place along the frame 130. An outboard locator strip 138 may be positioned over the outer channels 142 to hold the screws in place and prevent the screws from walking along the channel as a result of vibration or expansion and contraction.

The outer edges of the base member 132 terminate in a shoulder 310 having a groove 312 along its edge. When lens 110 is positioned on the frame 130, an inwardly projecting flange 314 of the outboard lens 114 and center lens 116 overlays the shoulder 312 to prevent water from seeping into the enclosure. The lens 110 may be provided with a downwardly projecting lip 316 opposite the groove 312 in the edge of the shoulder 310 to further enhance the water sealing between the lens 110 and frame 130. As a result, a gasket between the lens 110 and frame 130 along the length of the bar 100 is unnecessary. Holes 318 are provided for engaging screws which fasten the end caps to base 132.

Referring to FIGS. 9 and 10, lens end cap 112 is illustrated. As shown, the lens cap 112 includes interconnected compartments separated by baffles which permit water collected in the water collecting channels 306 to escape from the enclosure of the bar 110 while preventing water from entering into the enclosure. In particular, a gasket 402 is located between the end of base member 132 and the end cap 112. Gasket 402 includes openings 402 which are in registry with the water collecting channels 306 of the base member 132. As indicated by arrows 406, water which collects within channels 306 passes through the openings 404 and is collected in chamber 408 where it drains due to the force of gravity through orifice 410 in the bottom of chamber 408. Additionally, gasket 402 includes openings 412 which are in registry with the recesses 304 within which the capacitors of the modules rest. In the event that water collects within these recesses, it flows through openings 412 into chambers 414. Chambers 408 and 414 are separated by a baffle 416. Water is permitted to flow from chamber 414 into chamber 408 as indicated by the arrows 418, where the water once again escapes through orifice 410. The end caps are also provided with notches 420 which permit access to sleeves 422. Fasteners, such as self-tapping screws, may be positioned within sleeves 422 for engaging the end cap screw holes 318 (see FIG. 8).

FIG. 11 illustrates a transverse horizontal cross section of a support bracket 450 and cover 452. Bracket 450 is configured to rest on the top of wall 134 so that a fastener may be positioned within opening 454, the fastener having threads which engage the grooved channel 302. Bracket 450 supports the printed circuit board 454 on which the power supply components 456 for powering the various modules are located. In particular, printed circuit board 454 longitudinally slides into opposite channels 458. The length of board 454 corresponds to the length of the bracket 450 which corresponds to the length of the light bar 100. In other words, the longer the bar, the more modules needed, so that the bracket 450 can be longer to support a larger power supply circuit. Bracket 450 is provided with a wall 460 having outwardly projecting substantially horizontal fins 462. A grooved channel 464 is engaged by screw 466 to hold plate 468 in place. The plate 468 bears against transistors 470, pressing the transistors 470 against the vertical wall 460 so that heat generated by the transistors 470 is dissipated by fins 464. Cover 452 includes a retaining means 472 which engages a folded lip 474 of wall 460. The other end of cover 452 is held in place by a fastener 476 which engages the grooved channel 478 along the length of bracket 450. Bracket 450 permits the mounting of a control circuit including a power supply for selectively energizing the lamps above each of the modules. This provides several advantages over the prior art. First of all, mounting the electronics above the modules provides a structure which can be configured with 360° lighting. In much of the prior art, the electronics were positioned adjacent a module which prevented the 360° light coverage desirable in present day light bars. Second of all, the mounting of the control circuit above the modules raises the electronics above the base member 132 further avoiding the possibility that the electronics will become damaged by moisture or condensation within the enclosure. The positioning of bracket 450 also enhances heat dissipation.

FIG. 12 is a block diagram of the electronics according to the invention. Any circuit for powering a strobe tube and/or an incandescent lamp may be employed, such as disclosed in U.S. patent application Ser. No. 07/695,257 filed May 3, 1991, titled "Solid State Strobe Tube Control Circuit With Programmable Flash Pattern," invented by Steven A. Rose and co-assigned to the same assignee as this application. Ser. No. 07/695,257 is incorporated herein by reference in its entirety.

The circuit may include a microprocessor 500 for controlling the operation of the circuit. A program memory such as ROM 502 may be provided for storing software which controls the microprocessor 500. A key pad 504 is used by the operator to input information. In one preferred embodiment of the invention, the reflectors may be an LCD panel 506 or the filters may be an LCD panel 506 which is controlled by a state driver 508 for controlling the state of the LCD panel. Microprocessor 500 may also be associated with a pattern memory such as EEPROM 510 which stores the pattern information input by the operator via key pad 504. A clock 512 may be provided to provide timing for the circuit. Microprocessor 500 would control a strobe controller 514 which would selectively fire strobe lamp 516 according to the pattern input by the operator. Similarly, microprocessor 500 would control an incandescent controller 518 which would selectively fire an incandescent lamp 520. As shown in FIG. 12, both the strobe controller and incandescent lamp may be powered by the same power supply 522 or may be powered by separate supplies not shown. In one preferred embodiment according to the invention, it is contemplated that each strobe lamp have a separate capacitor for energizing the strobe lamp. For example, three or more strobe lamps may be employed in the modular bar 100 according to the invention, each of which has a separate capacitor associated therewith. In another preferred embodiment, strobe lamp 516 and incandescent lamp 520 would each be energized during each cycle of a flash pattern. Such flash patterns would be defined in pattern memory 510 and would be implemented by microprocessor 500 by providing appropriate signals to strobe controller 514 and incandescent controller 518. For example, a cycle may include two strobe flashes followed by an incandescent flash, followed by two more strobe flashes. Therefore, in the five flash cycle, both the strobe lamp 516 and the incandescent 520 would be energized.

Figure 14:
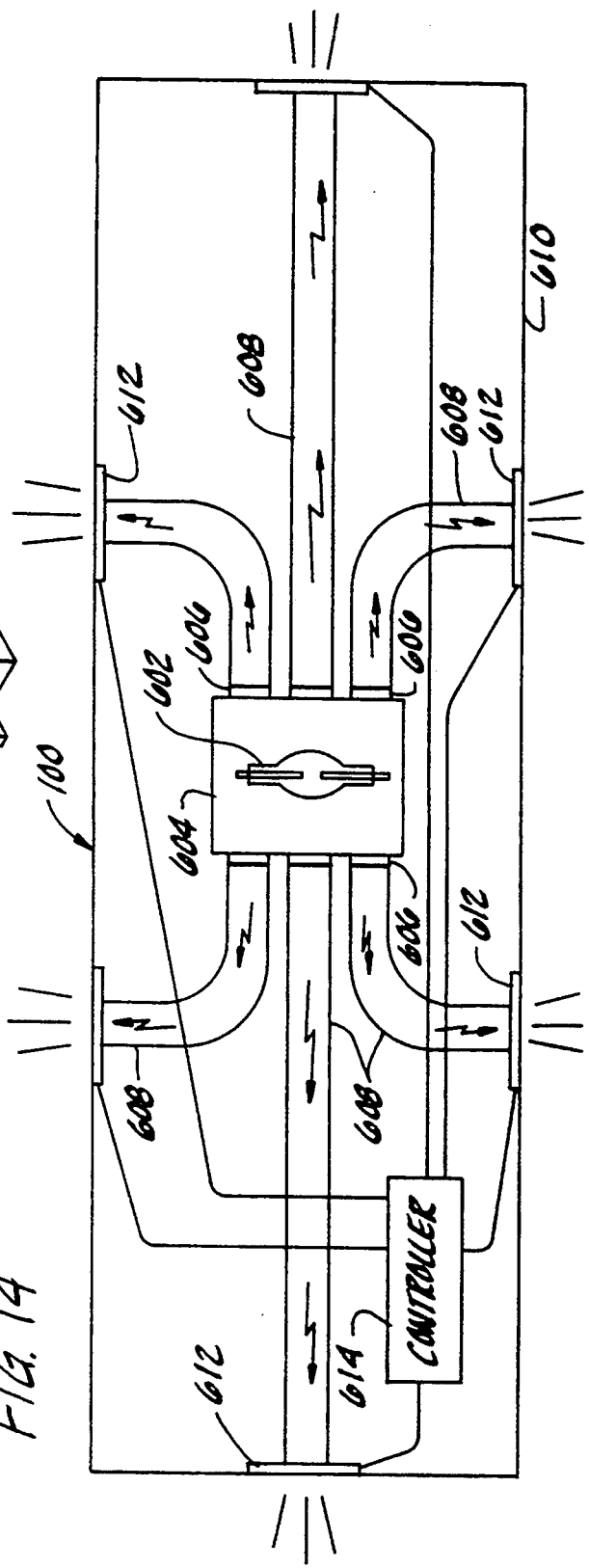
FIG. 14 is a top schematic view of a light bar according to the invention employing light pipes and filters and/or LCD panels at the ends of the light pipe to control the light patterns viewed by an observer.

FIG. 14 illustrates another preferred embodiment of a modular strobe bar 100 according to the invention. A light source 602, such as a high intensity discharge lamp is positioned within an enclosure 604 having an interior surface which is reflective. The enclosure 604 includes openings therein within which lens 606 may be positioned. Lenses 606 are associated with light pipes such as fiber optic filaments 608 for transmitting light to an outer surface of a housing 610 which forms an enclosure for the light bar 100. Each of the optical fibers terminates in an end which is positioned in front of means 612 for controlling light viewed by an observer. In general, it is contemplated that each of these controlling means 612 may be a filter or a mechanical shutter or an LCD screen which can be connected to a controller 614 which controls the state of the means 612. The means 612 is positioned adjacent to the end of the fiber 608 so that light emitted by the end of the fiber passes through the means 612. Controller 614 controls the transmissivity of the means 612. In particular, the means may be an LCD panel having a first state which is substantially transparent to visible light and a second state which transmit light within a limited range of wavelengths so that only visible light of a predetermined color is transmitted during the second state. Alternatively, the LCD panel may have a first state which is substantially transparent and a second state which is substantially opaque so that an observer would apparently see a flashing light as the LCD panel changes between the first and second states.

It is also contemplated that any of the reflectors of the modular light bar 100 may be an LCD panel reflector having various states of reflectivity. In such a case, the state driver 508 or the controller 614 would control the reflectivity of the reflector panel. In particular, the LCD reflector panel could have a first state which reflects substantially visible light and a second state which reflects only light of a particular color, i.e., within a limited range of wavelengths, so that only visible light of a predetermined color is reflected by the panel. Alternatively, the reflective panel may have a first state which is substantially reflective of all visible wavelengths and have a second state which is substantially non-reflective so that an observer would see either no reflected light or reflected light depending on the state of the reflector. Finally, in either embodiment, it is contemplated that the filter panel or the reflector panel may have two states which reflect two different colors so that an observer may view two different colors as the panels change state.

In view of the above, it will be seen that the several objects of the invention are achieved and other advantageous results attained.

As various changes could be made in the above constructions without departing from the scope of the invention, it is intended that all matter contained in the above description and shown in the accompanying drawing shall be interpreted as illustrative and not in a limiting sense.

What is claimed is:
1. A light bar comprising:
  a plurality of modules;
  a control circuit including one power supply circuit for selectively energizing each of the modules; and
  wherein each of said modules comprises:
    a strobe lamp curved about an axis having an anode and a cathode for energizing the strobe lamp and having a trigger for firing the strobe lamp;
    a reflector positioned adjacent the strobe lamp to reflect light emitted by the strobe lamp; and
    a circuit including a capacitor connected to the anode and the cathode for energizing the strobe lamp, said circuit connecting the capacitor and the trigger to the control circuit; and
  an incandescent lamp having an axis which intersects the axis of the strobe lamp.

2. The light bar of claim 1 wherein the strobe lamp is helically wound about a linear axis and the incandescent lamp comprises a tube elongated along an axis positioned coaxial with the linear axis.

3. The light bar of claim 1 wherein each module further includes a filter on the reflector for filtering light emitted by the lamp and for filtering light reflected by the reflector, each of the filters having an extended portion for overlapping with an adjacent filter.

4. The light bar of claim 1 wherein each of the circuits includes a capacitor connected to the strobe for energizing the strobe and further comprising an elongate base member adapted to receive a plurality of the modules, said modules mounted such that the base is adjacent the capacitors thereby permitting heat transfer from the capacitors to the base.

5. The light bar of claim 4 wherein the base has a recess for receiving the capacitors when the modules are mounted to the base.

6. The light bar of claim 1 wherein the lamp of at least one module emits visible light of a predetermined color different from the visible light emitted by the lamp of another of the modules.

7. The light bar of claim 1 having at least three modules and further comprising means for mounting the light bar on a vehicle, 8. The light bar of claim 1 having at least one curved module having a reflector with a curved axis; at least one linear module with a reflector with a linear axis; a curved lamp positioned coaxial with one of the axes so that light emitted by the curved lamp is reflected by the reflectors; and means for contiguously supporting the modules so that the modules are contiguous to each other whereby the one linear module and the one corner module form a "J" combination.

9. The light bar of claim 1 having at least two linear modules, each with a reflector with a linear axis; said light bar having at least one linear lamp positioned coaxial with the linear axes so that light emitted by the linear lamp is reflected by the reflector; and means for contiguously supporting the modules so that the two modules are positioned contiguous to each other whereby the axes of the two linear modules are colinear.

10. The light bar of claim 1 having at least two curved modules, each having a reflector with a curved axis; said light bar having at least one curved lamp positioned coaxial with the curved axes so that light emitted by the curved lamp is reflected by the reflectors; and means for contiguously supporting the two corner modules so that the two modules are positioned contiguous to each other whereby the two corner modules form a 180° combination.

11. The light bar of claim 1 further comprising an elongate base member adapted to receive the plurality of modules, said base member having a substantially horizontal planar member and a substantially vertical planar member on the horizontal member to form a base having a cross section in the shape of an inverted "T".

12. The light bar of claim 1 further comprising a filter panel positioned adjacent the strobe lamp and the reflector so that light emitted by the strobe lamp passes through the panel and light emitted by the strobe lamp and reflected by the reflector passes through the panel; and means for controlling transmissivity of the panel.

13. The light bar of claim 1 wherein the reflector comprises a reflector panel and further comprising means for controlling reflectivity of the reflector panel.

14. A light bar comprising:
a plurality of modules;
a control circuit including a power supply for selectively energizing each of the modules;
wherein each of said modules comprises:
a strobe lamp having an anode and a cathode for energizing the strobe lamp and having a trigger for firing the strobe lamp;
a reflector positioned adjacent the strobe lamp to reflect light emitted by the strobe lamp; and
a circuit connected to the anode and the cathode for energizing the strobe lamp, said circuit connecting the trigger to the control circuit and having a capacitor connected to the strobe lamp for energizing the strobe lamp; and
an elongate frame adapted to receive the plurality of modules, said frame having a base adapted to receive and support the plurality of modules and a member upwardly projecting from the base, said member adapted to support the control circuit so that the frame has a transverse cross section in the shape of an inverted "T", said modules mounted such that the base is adjacent the capacitors thereby permitting heat transfer from the capacitors to the base.

15. The light bar of claim 14 wherein the control circuit includes a printed circuit board and further including a support engaging the upwardly projecting member and having opposite channels therein for receiving the printed circuit board.

16. The light bar of claim 14 further comprising fasteners for attaching each module to the base and wherein the base includes at least one channel along its elongate length for receiving the fasteners.

17. The light bar of claim 16 further comprising a strip on the channel having openings therein in which the fasteners are positioned whereby movement of the fasteners along the channel is prevented.

18. The light bar of claim 14 further comprising lens means positioned on the frame forming an enclosure with the base within which the modules are located.

19. The light bar of claim 18 wherein the base has a recess for collecting moisture and the lens means has a chamber having openings therein communicating between the moisture collecting recess and an outer surface of the enclosure so that the chamber permits moisture to exit the enclosure through the openings and inhibits moisture from entering the enclosure through the openings.

20. The light bar of claim 19 wherein the base has a recess for receiving the capacitors when the modules are mounted to the base.

21. An apparatus for use with an emergency vehicle to provide an emergency warning signal to be viewed by an observer, said apparatus comprising:
a light bar having a base and a lens covering the base;
a plurality of warning light assemblies mounted on the base and under the lens, at least one of the light assemblies including a high intensity discharge (HID) continuous burning arc lamp on the base and a reflector on the base positioned adjacent the lamp to reflect light emitted by the lamp;
a power supply for energizing the light assemblies; and
means for mounting the light bar on the vehicle.

22. The apparatus of claim 21 further comprising means for causing the HID lamp to provide a flashing pattern whereby the HID lamp appears to the observer as a flashing light.

23. The apparatus of claim 22 wherein the causing means comprises means for flashing the HID lamp.

24. A light bar comprising:
two curved modules, each having a reflector with a curved axis;
at least one linear module with a reflector with a linear axis;
at least one curved lamp positioned coaxial with the curved axes of the curved modules so that light emitted by the curved lamp is reflected by the reflectors of the curved modules;
an elongate frame for contiguously supporting the modules so that any two modules may be positioned contiguous to each other whereby the one linear module and the one curved module may be contiguous to form a "J" combination, said frame having a base and a member upwardly projecting from the base so that the frame has a transverse cross section in the shape of an inverted "T";
a control circuit including a power supply for selectively energizing each of the modules; and
means for contiguously supporting the two curved modules so that the two curved modules are positioned contiguous to each other whereby the two curved modules form a 180° combination.

25. The light bar of claim 24 having at least two linear modules, each module with a reflector with a linear axis; said light bar having at least one linear lamp positioned coaxial with the linear axis so that light emitted by the linear lamp is reflected by the reflector; and means for contiguously supporting the modules so that the two modules are positioned contiguous to each other whereby the axes of the two linear modules are colinear.

26. An emergency warning light for use on a vehicle comprising:
a strobe lamp comprising an elongate glass envelope defining first and second ends, said envelope having a first terminal at the first end of the elongate glass envelope, a central terminal located between the first and second ends, and a second terminal at the second end of the elongate glass envelope, said lamp having a trigger on the envelope for firing the strobe lamp; and
a circuit for energizing the strobe lamp having one terminal connected to the first and second terminals and having a second terminal connected to the central terminal;
a reflector positioned adjacent the lamp to reflect light emitted by the lamp; and
means for supporting said strobe lamp and said reflector on the vehicle.

27. An emergency warning light for use with a vehicle comprising:
a reflector having a focal point;

a first lamp defining an axis;

means for supporting the first lamp adjacent the reflector such that the axis of the first lamp substantially intersects the focal point of the reflector so that the reflector reflects light emitted by the first lamp;

a second lamp having an axis;

means for supporting the second lamp adjacent the reflector such that the axis of the second lamp is coaxial with the axis of the first lamp and substantially intersects the focal point of the reflector so that the reflector reflects light emitted by the first lamp and the second lamp;

a power supply for selectively energizing each of the lamps; and means for supporting the reflector on the vehicle.

28. The light of claim 27 wherein one of the lamps is a strobe and the other lamp is an incandescent lamp.

29. An emergency warning light for use with a vehicle comprising:

a reflector having a focal point;

a strobe lamp for emitting visible light within a first predetermined range;

means for supporting the strobe lamp adjacent the reflector substantially coincident with the focal point of the reflector such that the reflector reflects light emitted by the strobe lamp;

an incandescent lamp for emitting visible light within a second predetermined range different from the first predetermined range;

means for supporting the incandescent lamp adjacent the reflector substantially coincident with the focal point of the reflector such that the reflector reflects light emitted by the strobe lamp and the incandescent lamp;

a control circuit including a power supply for selectively energizing each of the lamps; and means for supporting the reflector on the vehicle.

30. The light of claim 29 wherein either the first or second range defines visible light of a predetermined color whereby the reflector reflects colored light emitted by the strobe lamp and white light emitted by the incandescent lamp when only the first predetermined range defines visible light of a predetermined color, whereby the reflector reflects colored light emitted by the incandescent lamp and white light emitted by the strobe lamp when only the second predetermined range defines visible light of a predetermined color, and whereby the reflector reflects colored light emitted by the incandescent lamp and a different colored light emitted by the strobe lamp when both the first and second predetermined ranges define visible light of different predetermined color.

31. An emergency warning light for use with a vehicle comprising:

a reflector having a focal point;

a strobe lamp;

means for supporting the strobe lamp adjacent the reflector substantially coincident with the focal point of the reflector such that the reflector reflects light emitted by the strobe lamp;

an incandescent lamp;

means for supporting the incandescent lamp adjacent the reflector substantially coincident with the focal point of the reflector such that the reflector reflects light emitted by the strobe lamp and the incandescent lamp;

a control circuit including a power supply for selectively energizing each of the lamps in accordance with a preset flash pattern during which both the strobe lamp and the incandescent lamp are energized during one cycle of the preset flash pattern; and means for supporting the reflector on the vehicle.

* * * * *